(12) United States Patent
McClure

(10) Patent No.: US 6,750,896 B2
(45) Date of Patent: Jun. 15, 2004

(54) SYSTEM AND METHOD FOR CONTROLLING VIDEO CALLS THROUGH A TELEPHONE NETWORK

(75) Inventor: Kimbry L. McClure, Austin, TX (US)

(73) Assignee: Forgent Networks, Inc., Austin, TX (US)

(*) Notice: Subject to any disclaimer, the term of this patent is extended or adjusted under 35 U.S.C. 154(b) by 0 days.

(21) Appl. No.: 09/981,609

(22) Filed: Oct. 16, 2001

(65) Prior Publication Data

US 2003/0071890 A1 Apr. 17, 2003

(51) Int. Cl.[7] .................................................. H04N 7/14
(52) U.S. Cl. ................................. 348/14.01; 348/14.03; 370/352
(58) Field of Search ......................... 348/14.01–14.09; 370/352; 379/90.01, 93.17, 93.23, 93.19; H04N 7/14

(56) References Cited

U.S. PATENT DOCUMENTS 6,192,118 B1 * 2/2001 Bayless et al. ............. 379/201

FOREIGN PATENT DOCUMENTS

| JP | 404200192 A | * | 7/1992 | ............ H04N/7/14 |
| JP | 408195820 A | * | 7/1996 | ............ H04M/3/56 |
| JP | 409172509 A | * | 6/1997 | .......... H04M/15/00 |
| JP | 411220549 A | * | 8/1999 | .......... H04M/11/00 |
| JP | 2000-341341 | * | 12/2000 | .......... H04L/12/66 |
| JP | 02000341341 A | * | 12/2000 | .......... H04L/12/66 |
| JP | 020012116190 A | * | 8/2001 | ......... G06F/12/000 |

* cited by examiner

Primary Examiner—Melur Ramakrishnaiah
(74) Attorney, Agent, or Firm—Hamilton & Terrile, LLP; Robert W. Holland

(57) ABSTRACT

Video calls between video devices are controlled by presenting video call options and receiving inputs of video call information through a telephone network. A video call application associated with a phone server receives video call information and provides the information to a video launch application that controls video devices accordingly. In one embodiment, IP telephones provide video call options such as initiating and terminating video calls through an IP telephone server to a video network platform using XML formatted data. The video network platform provides video call options based on user code information to simplify the IP telephone interface. The video network platform performs the functions represented by the video call information to establish and terminate video calls as appropriate.

20 Claims, 3 Drawing Sheets

SYSTEM AND METHOD FOR CONTROLLING VIDEO CALLS THROUGH A TELEPHONE NETWORK

TECHNICAL FIELD OF INVENTION

This invention relates generally to video network communications, and more specifically relates to a system and method for controlling video network devices through a telephone network.

BACKGROUND OF THE INVENTION

Video calls have grown more common as the cost of video call equipment has decreased and the availability of bandwidth has increased. For instance, many video call functions that were handled by expensive specialized equipment are now handled by software applications operating on TCP/IP networks. One example is the video device end point itself which have typically used specialized hardware to digitize and transmit video and audio signals for display on televisions. These specialized devices have decreased in cost and now run over local area networks and even as software applications running on personal computers. Another example is the multi call units (MCUs) which coordinate video conferences between multiple end points using specialized hardware. MCU functionality is now also provided by MCU software applications running on a server that coordinates multiple video call end points by processing TCP/IP packets.

Although the transition from specialized hardware to network applications has decreased the cost of video calls, it has not necessarily decreased the complexity of making video calls. Indeed, in many respects the integration of specialized hardware and network applications has added another layer of complexity for the end users of video devices. Typically, business enterprises that deploy video networking capability maintain technical staff to arrange video calls, schedule the use of video equipment and address problems that arise for end users. Typically, difficulties arise due to the interaction of disparate types of devices, such as end points made by different manufacturers. For video call applications deployed to desktops, similar hardware and software configuration difficulties often arise. In addition, the lack of a common interface to communicate with disparate devices for scheduling and controlling video calls increase end user dependence on trained staff that is familiar with specialized interfaces. This is true even for repetitive business events, such as weekly meetings, that use the same endpoints for each event since different types of video devices, such as MCUs and gateways, may be used to support the same endpoints.

Another difficulty with installing, updating and maintaining visual communications applications and solutions is that the applications and solutions may interact with desktops in business enterprise networks. Many business enterprises maintain strict configuration control on desktop applications that tend to substantially delay the validation and deployment of applications to desktops of the network. Thus, decentralized video communication applications are often delayed in deployment and maintenance if they interact with desktops. Integration of desktop applications, business enterprise networks and specialized video conferencing equipment presents a complex task that is typically expensive to accomplish and difficult to successfully maintain in a user friendly environment.

SUMMARY OF THE INVENTION

Therefore a need has arisen for a system and method which provides a programmable interface to control video calls through a telephone network.

A further need has arisen for a system and method which provides a simple and cost effective user interface to initiate and control video calls between disparate end point types.

A further need has arisen for a system and method which provides control of video calls by end users through telephone devices that allow end users to easily establish video calls that are repetitive business events.

In accordance with the present invention, a system and method are provided which substantially reduce the problems and disadvantages of controlling video calls. A telephone network accepts video call information input through telephones and provides the video call information to a video network that controls video calls between two or more video devices according to the video call information.

More specifically, a video call application associated with a telephone network acts as a programmable interface to extend video call options to telephones interfaced with the telephone network. Users of the telephones select video call options through the telephones that are forwarded as video call information to the video network for controlling video devices. For instance, a voice over internet protocol (VOIP) telephone network presents video call options through internet protocol (IP) telephones with a video call application associated with the VOIP telephone network.

A video network platform interfaced with the telephone network accepts the video call information and executes control of video devices accordingly. A video launch application associated with the video network platform applies a user data base and address data base to validate video call options of a user and execute desired video call instructions. For instance, the video call application stores video call information in Extensible Mark-up Language (XML) format and calls a video launch application associated with the video network platform. The video call information includes a user code received from an IP telephone. The video launch application determines the video call options for the user code from the user data base and makes predetermined address data base information available to the video call application for presentation to users through the IP telephones. Video call options available to users include basic functions such as establishing and terminating video calls, or more complex functions, such as programming the video network platform by network maintenance personnel.

The present invention provides a number of important technical advantages. One important technical advantage is that the video call application associated with the telephone network provides a ubiquitous programmable interface that extends video call control to simple and commonly used telecommunication devices. In particular, a VOIP telephone network server provides a centralized intelligent terminal to interface with a video network platform for communicating video call information to control video calls. IP telephones are user friendly devices able to present video call options to users through simple LED screens or voice commands in a manner that users are easily able to understand as similar to the options provided by conventional voice mail systems.

Another important technical advantage of the present invention is that the telephone network provides a uniform interface as an alternative and cost effective way of delivering server-based video call applications without interfering with business enterprise control of desktop applications, configuration and hardware. The use of a telephone network, such as a VOIP telephone network provides a centralized programmable interface that makes wide deployment of video call functions more simple and less expensive to accomplish. Thus, for instance, updating video call options is accomplished through programming of the telephone network server, thus reducing the need to address disparate video devices and desktop applications and hardware on an individual basis.

Another important technical advantage of the present invention is that the use of a telephone interface to control video calls provides portability for users throughout a business enterprise and even outside of a business enterprise while minimizing the need for help from technical network staff. For instance, a user selects a user code at a telephone interface to provide video call options specific for a user regardless of the user's physical location. As an example, a speed dial video call option allows a user to initiate video calls to one or more video end points for repetitive business events, such as weekly meetings. The address and video call configuration of the desired end points are available from the user data base and address data base, while the physical location of the user is determinable from the IP address of the IP telephone used as the interface, or through user inputs. Customization of users, events and rooms is programmable through the VOIP phone server, even from remote sites, or through the video network platform.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention are illustrated in the FIGURES, like numerals being used to refer to like and corresponding parts of the various drawings.

Video conferences are an excellent business tool that allow personal communication between participants, including the sharing of data and presentations, while offering substantial savings over traveling by participants to a common physical location. As video conferencing has grown in popularity, an increasing number of regularly scheduled meetings are supported through video conferencing equipment. However, scheduling, establishing and maintaining a video conference often presents a complex task that involves coordination between call participants and technical staff at each call site. For instance, a typical call between three or more device end points may involve multi call units (MCUs) to coordinate the video calls, gateways to ensure consistent protocols and preservations of bandwidth to ensure video conference quality. In addition to this coordination effort, the compatibility of end points and application software must be handled as well as difficulties such as video device failures and participant requests that may arise during a video conference. The present invention provides a uniform and easy to use interface that simplifies control of video calls to an end user level.

Figure 1:
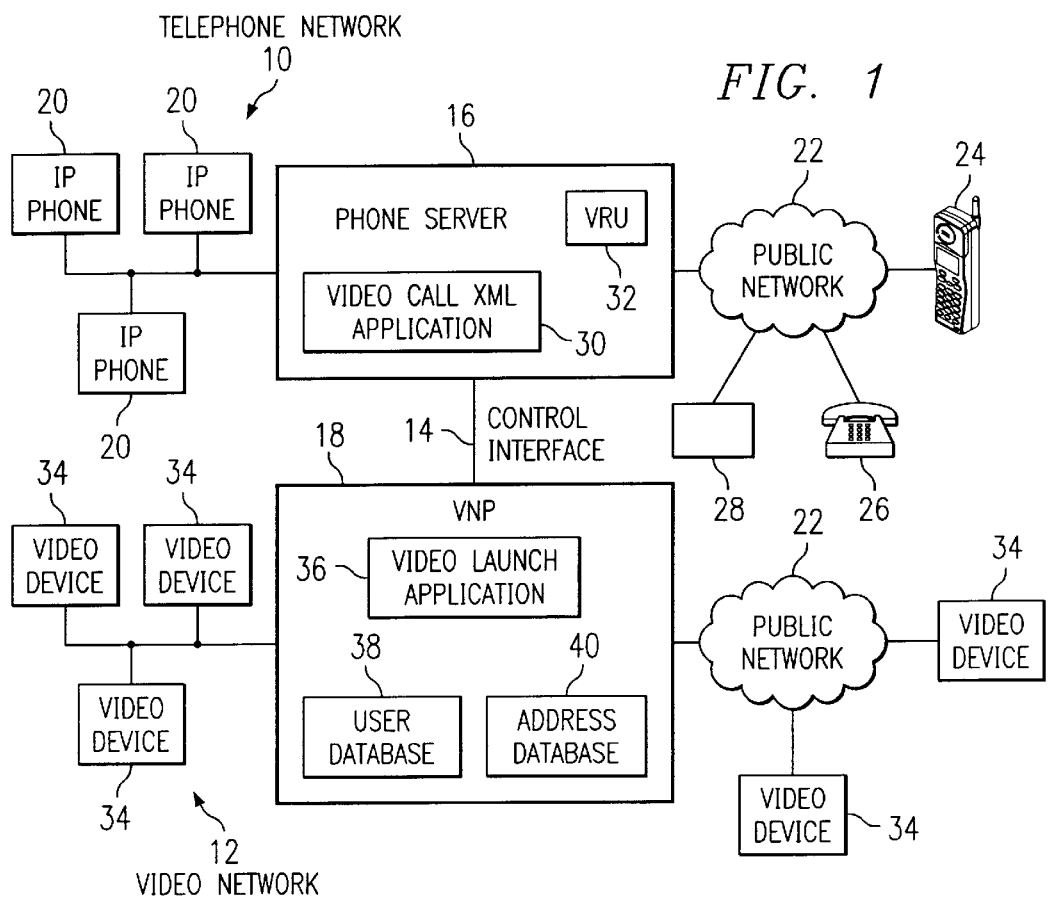
FIG. 1 depicts a block diagram of a phone network interfaced to control video devices.

Referring now to FIG. 1, a block diagram depicts a telephone network 10 in communication with a video network 12 through a control interface 14. Telephone network 10 provides video call options to users and receives video call information to control video calls by communicating the video call information as XML data through control interface 14 to video network 12. In the depicted embodiment, telephone network 10 is a VOIP telephone network which may run on a separate phone server 16 or run as an application on a network server that also supports a video network platform 18 or other applications.

Telephone network 10 is interfaced with plural internet protocol (IP) telephones 20, such as the Cisco 7960 IP telephone. IP telephones 20 provide normal telephone functionality, such as telephone communications and voice mail functions, and are also operable to communicate information with phone server 16 using Extensible Mark-up Language (XML). Phone server 16 switches communications between IP phones 20 and a public network 22 by routing VOIP packets within the telephone network and interfacing with public network 22 over standard interfaces. Public network 22 interfaces with phone server 16 to support external telephone communications, such as from a cell phone 24 having internet capability, conventional telephone devices 26 and personal computers 28.

A video call XML application 30 operates on phone server 16 to communicate video call options and video call information between devices interfaced with phone server 16 and video network platform 18. For instance, XML formatted data is communicated between IP telephones 20 and video call XML application 30 as TCP/IP packets. Alternatively, video call XML application 30 may take advantage of features of phone server 16 to communicate with external devices such as cell phone 24, telephone device 26 and personal computer 28 interfaced with phone server 16 through public network 22. For instance, a voice response unit 32 communicates video call options and video call information via audio signals similar to those typically provided by voice mail systems. Alternatively web browsers on cell phone 24 and personal computer 28 communicates video call options and video call information as XML data via the internet.

Video network platform 18 is a video call control application that interfaces with and controls plural video devices 34 of video network 12. For instance, video network platform 18 establishes and terminates video calls between video end points using MCUs and gateways of video network 12 or through public network 22 to external video devices. For instance, video end points of video network 12 may establish a multi site video conference with external video devices through public network 22 using MCUs to coordinate the calls and gateways to ensure consistent protocols. Networks that support the video calls include local area networks, wide area networks, the internet, ISDN and other conventional interfaces. Video devices 34 include a variety of disparate types of video end points made by different manufacturers, including personal computers, and hardware and software applications that perform video call functionality. Video network platform 18 establishes video calls in an automated manner.

A video launch application 36 operates on video network platform 18 to communicate with video call XML application 30 of telephone network 10. Video launch application 36 accesses a user data base 38 and an address data base 40 to provide video call options to video call XML application 30 for presentation on IP telephones 20. Video launch application 36 also receives video call information input in response to video call options and applies the video call information to perform the requested options with the video devices 34. User database 38 tracks authorized users and video call options for the users based on user code information received from video call XML application 30. For instance, different types and numbers of options are available to different users based on the user's level of authorized access. A user code associated with an ordinary member of an organization may allow that member to perform basic functions such as initiating a call, hanging up a call, adding participants during a call and accessing an address book associated with the user from address database 40. Other members of the organization may have more detailed options based on their training, expertise or position in network maintenance staff. A network maintenance staff member may have options that allow the staff member to program video network platform 18 or set up calls. The association of user codes with different levels of options advantageously provides a portability to the control of video calls by allowing call participants and network staff to control calls from internal IP telephones as well as external telephone and browser devices.

Figure 2:
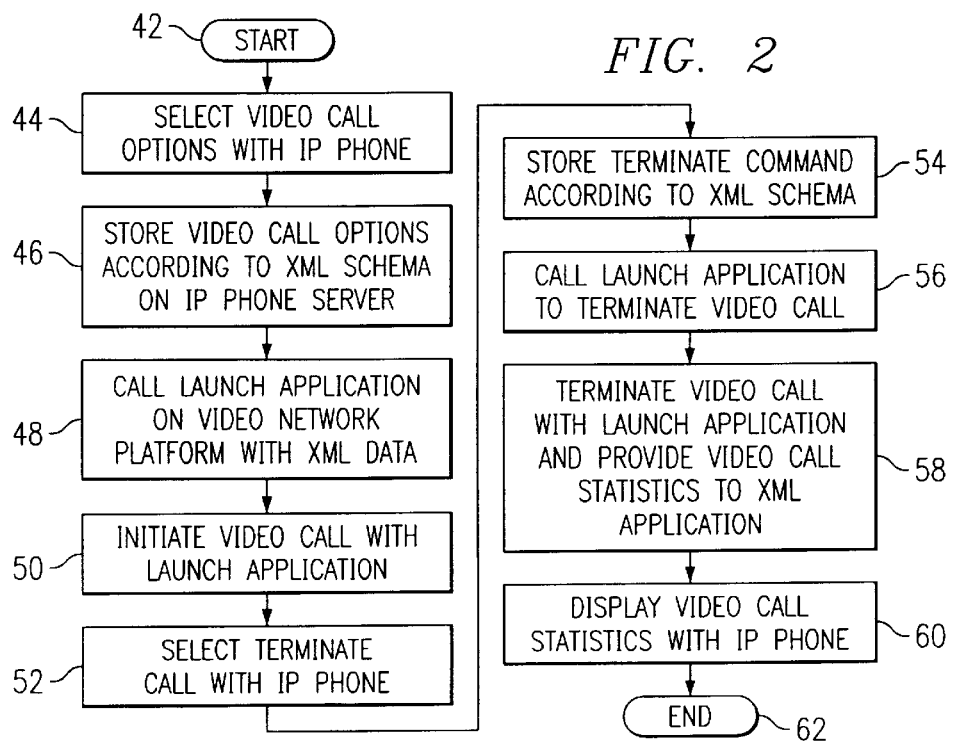
FIG. 2 depicts a flow diagram for controlling video devices through a telephone network.
Figure 3A:
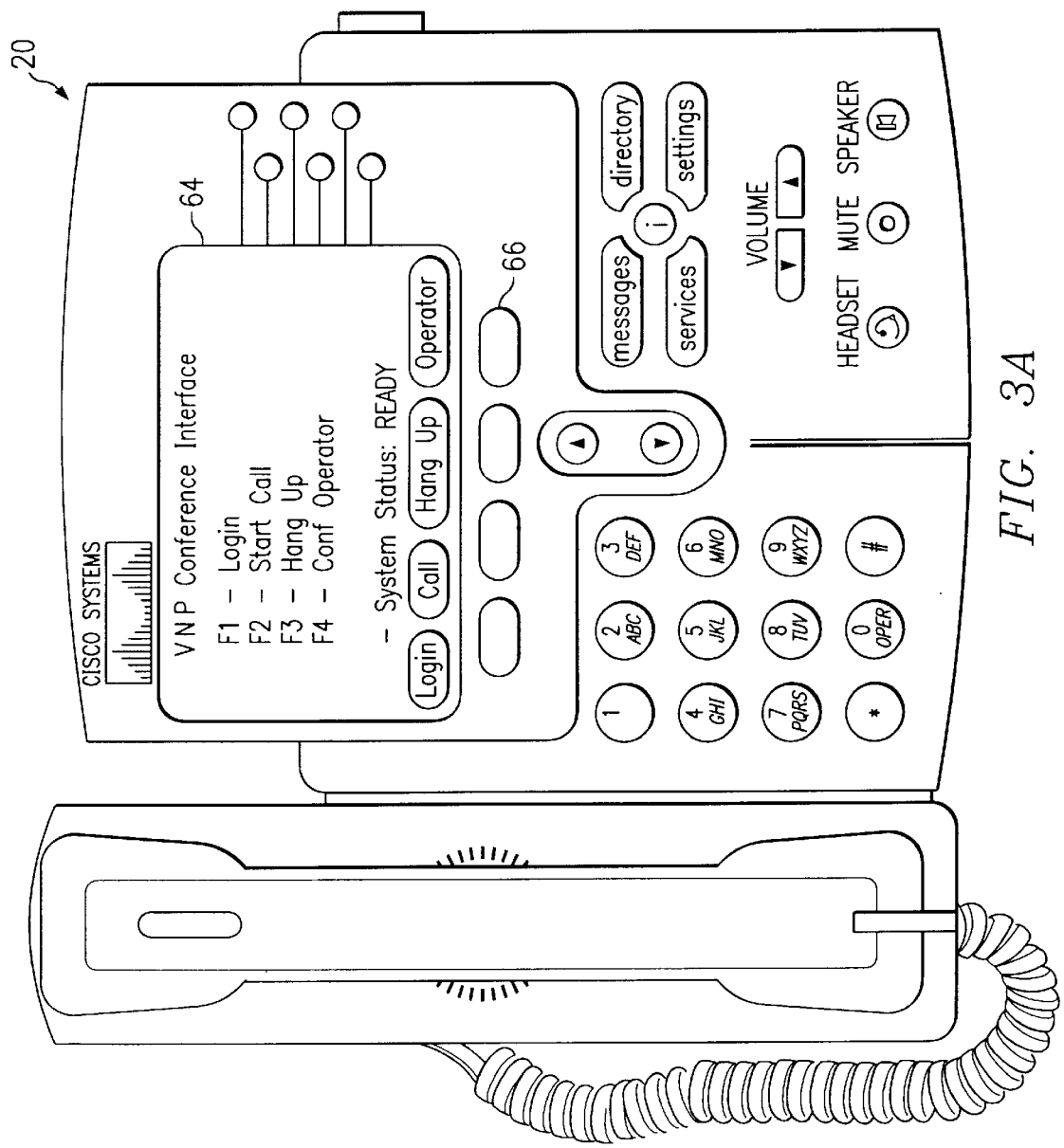
FIGS. 3a, 3b and 3c depict graphical interfaces presented by IP telephones for controlling video calls.

An example of control of a video call illustrates the application of the present invention in an IP telephone network and video call network. Referring now to FIG. 2, a flow diagram depicts the initiation and termination of a video call in conjunction with LCD displays of a Cisco 7960 IP telephone depicted by FIGS. 3*a*, 3*b* and 3*c*. Control of a video call starts at step 42 with the LCD display 64 of IP telephone 20 depicted by FIG. 3*a*. LCD display 64 depicts four options for selection by a user including log-in with the user's user code, starting a call, hanging up a call, and contacting a conference operator. The user selects the option with function button 66.

Figure 3C:
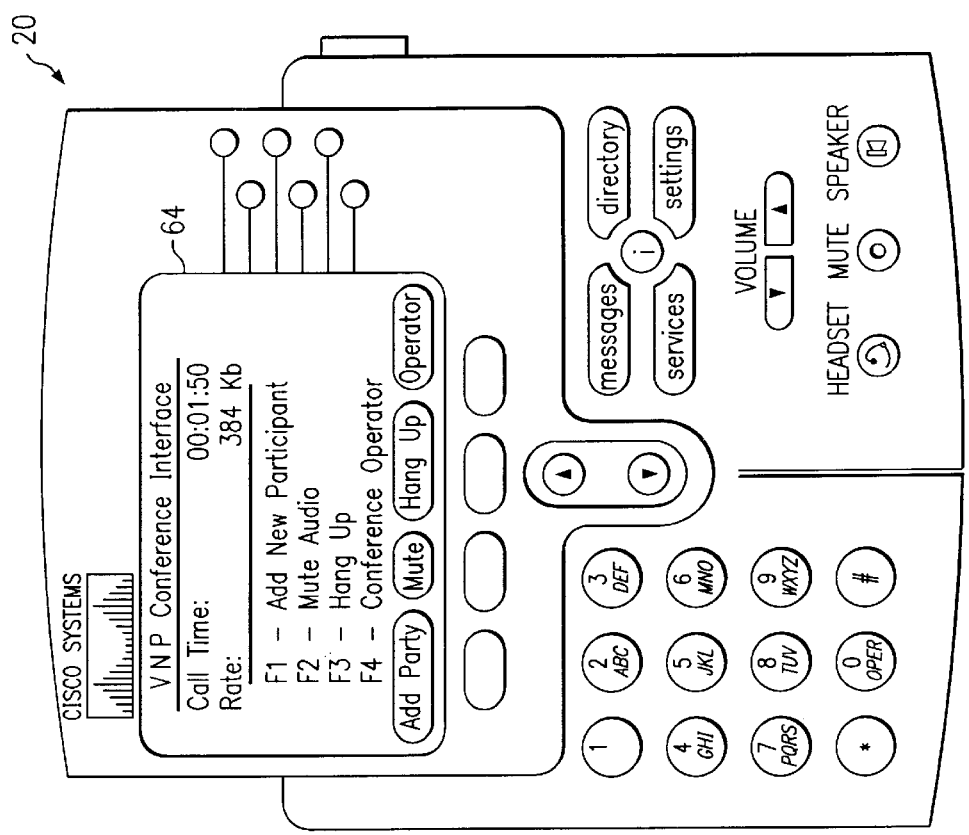
Figure 3B:
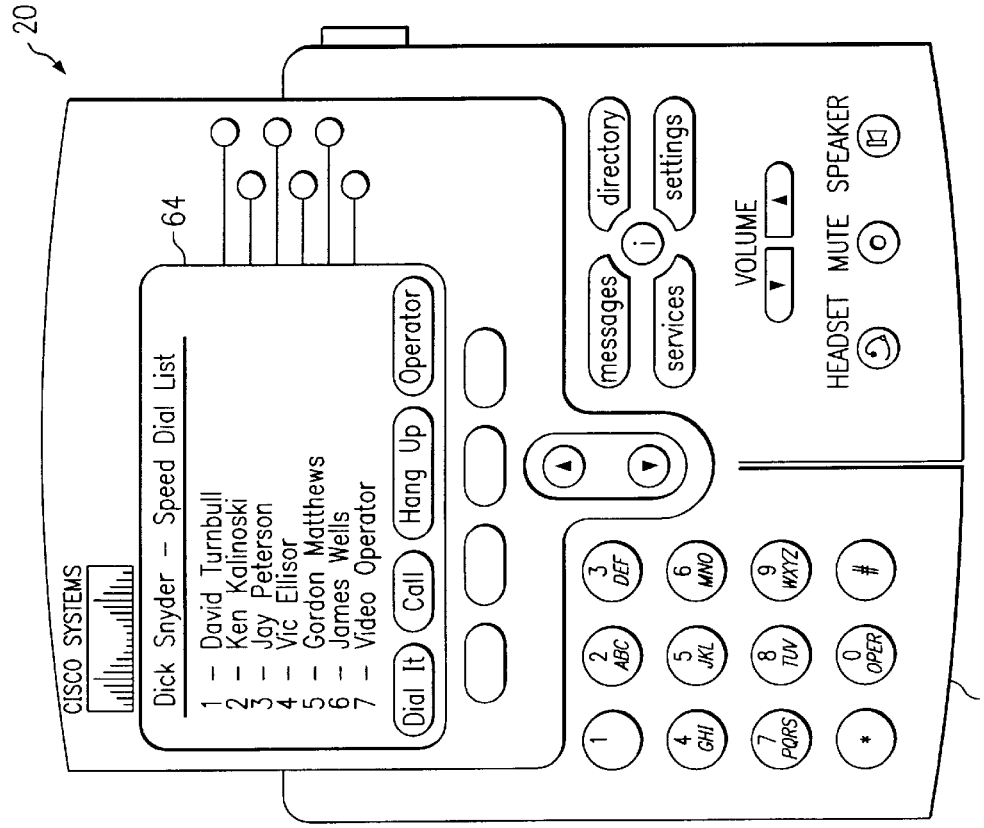

At step 44, the user selects a video call option with IP telephone 20. Once a user selects the log-in option and provides his user code, user data base 38 may define a variety of options for the user to select. For instance, the LCD display 64 of FIG. 3*b* depicts a speed dial options list for Dick Snyder to allow the initiation of a call to one of six individuals or a video operator with a speed dial selection of a single number from the number pad 68 of IP telephone 20. Similarly, the LCD display 64 of FIG. 3*c* depicts options available during a video call including the addition of new participants, the meeting of audio of the video device, hanging up the video call and adding a conference operator. Other options available through LCD display 64 may include the inputting of information to dial specific video calls or access desired address book information associated with the user by the user code. At step 46, each selection of video call options by a user through an IP telephone 20 results in the storage of video call information to the video call XML application 30 of phone server 16.

At step 48, once video call information is stored in video call XML application 30, video call XML application 30 calls video launch application 36 on video network platform 18 to perform the functions requested by selection of the video call options by the user. Data is transferred from video call XML application 30 to video launch application 36 according to an XML schema so that video network platform 18 performs the requested actions. For instance, at step 50 video network platform 18 initiates a video call between Dick Snyder and Gordon Matthews in response to Dick Snyder's selection of the number five at the display depicted by FIG. 3*b*. User data base 38 and address data base 40 provide the network address for the video end point associated with the IP telephone 20 used by Dick Snyder and the video end point associated with Gordon Matthews to launch the video call. Similarly, if Dick Snyder elects to add a new participant to his call with Gordon Matthews through the selection of function F1 depicted by LCD screen 64 in FIG. 3*c*, then video network platform 18 locates an MCU video device or other necessary components and adds the new participant selected by Dick Snyder. If the new participant is not on Dick Snyder's speed dial list, then he is presented with the opportunity to input call information or request aid from an operator.

At step 52, IP telephones 20 allow the termination of the video call by selection of function F3 of LCD display 64 depicted by FIG. 3*c*. At step 54, selection of the hang-up video call option stores a terminate command in the video call XML application 30 according to the XML schema. At step 56, the video call XML application 30 calls video launch application 36 to terminate the video call. At step 58 video network platform 18 terminates the video call and collects video call statistics, such as time and expense, and provides those statistics to video call XML application 30. At step 60, video call statistics are displayed by LCD display 64 and then, at step 62, video call control ends with the display of FIG. 3*a* prepared to accept additional video call options.

The present invention advantageously uses a single common and well known device to communicate with and control a server based application which in turn controls video call conferences, thus unifying control of disparate types of complex video devices through a "known" telephone device. This simplifies management and maintenance of video conference device configuration and control without the distribution of applications to the local telephone control devices or video devices. This also reduces deployment and validation complexity and enhances acceptance by end users through delivery of server based applications by common and accepted telephone input commands. In the embodiment that uses VOIP networks and devices, video call functions are customizable for users, events, locations and applications. For instance repeated business meeting events between predetermined users and rooms can be speed dialed through a customized speed dial application associated with a user code entered through an IP telephone. For a user seeking to initiate a video call from a conference room, a speed dial list to other users or conference rooms allows initiation of a video call between that desired room or participant and the video call end point associated with the IP telephone IP address. A speed dial selection may include prestored video device settings for setting up the video call or may recall previous video setups, such as for regular meetings. Further, scheduled events are saved so that IP telephones of a scheduled location prevent unscheduled use of video devices at that location.

In alternative embodiments, a phone server provides video call options selectable by telephone inputs received from conventional telephone devices, browsers and remote telephone devices interfaced through a public network. The telephone server accepts audio commands or web browser inputs to allow a user to establish, terminate and otherwise control functions available through video network platform 18. Network staff are thus able to actively control scheduling functions from any location where a telephone interface can be established. For instance, a user code for network staff permits complex scheduling activity through the telephone server, including the programming of the address and user databases.

Although the present invention has been described in detail, it should be understood that various changes, substitutions and alterations can be made hereto without departing from the spirit and scope of the invention as defined by the appended claims.

What is claimed is:

1. A method for controlling a video call, the method comprising:
   inputting video call information through non-video IP telephone to a telephone server;
   providing the video call information from the telephone server to a video network; and
   controlling a video call between two or more video devices of the video network according to the video call information; wherein video call information comprises XML formatted data.

2. The method of claim 1 wherein controlling a video call further comprises establishing a video call between the two or more video devices.

3. The method of claim 2 wherein inputting video call information further comprises:
   inputting a user code through the IP telephone to the telephone server;
   retrieving video call option information associated with the user code;
   providing the video call option information through the IP telephone; and
   selecting an option that initiates the video call between the video devices.

4. The method of claim 3 wherein the user code is associated with a user and the video call option information comprises a speed dial option having plural predetermined video call configurations.

5. The method of claim 3 wherein providing the video call option information comprises presenting options on a screen associated with the IP telephone for a user to select to control a video call.

6. The method of claim 3 wherein providing the video call option information comprises providing audio option information over the IP telephone for the user to select to control a video call.

7. The method of claim 2 wherein the video devices comprise video end points and video multi call units.

8. A system for establishing video calls, the system comprising:
   plural video devices;
   a telephone network having plural non-video VoIP telephones interfaced with a telephone server;
   a video network platform interfaced with the plural video devices and the telephone network, the video network platform operable to establish a video call between two or more video devices; and
   a user database accessible by telephone, the user database having one or more video call options;
   wherein video call options include XML formatted data;
   wherein the telephone server is operable to direct the video network platform to establish a video call between two or more video devices according to a video call option received through a non-video VoIP telephone.

9. The system of claim 8 wherein the telephone network comprises a VOIP telephone network.

10. The system of claim 9 wherein the VOIP network interfaces with the public telephone network and the telephone comprises a telephone associated with public telephone network.

11. The system of claim 10 wherein the telephone communicates with the telephone server by audio signals.

12. The system of claim 10 wherein the telephone communicates with the telephone server through a browser associated with the telephone.

13. A method for controlling a video call, the method comprising:
   presenting video call options through a VoIP telephone;
   selecting one or more video call options at the VoIP telephone;
   storing the selected video call options as XML data at a server associated with the VoIP telephone; and
   calling a video launch application with the server to establish a video call between two or more video endpoints according to the selected video call options.

14. The method of claim 13 wherein the VoIP telephone has an IP address at a predetermined location.

15. The method of claim 14 wherein the video launch application establishes a video call between a video end point associated with predetermined location of the IP phone and a video endpoint selected as a video call option.

16. The method of claim 13 further comprising: calling the video launch application to add an additional end point to the established video call.

17. The method of claim 13 wherein the video call options comprise a speed dial list.

18. The method of claim 13 wherein the video call options comprise initiation of a scheduled video call.

19. The method of claim 13 wherein the video call options comprise input of a user code, the user code associated with predetermined call options.

20. The method of claim 19 wherein the video call options comprise selection from an address book associated with the user code.

* * * * *